W. GUNNARSON.
WEED DESTROYER.
APPLICATION FILED JULY 7, 1914.
1,118,854.
Patented Nov. 24, 1914.
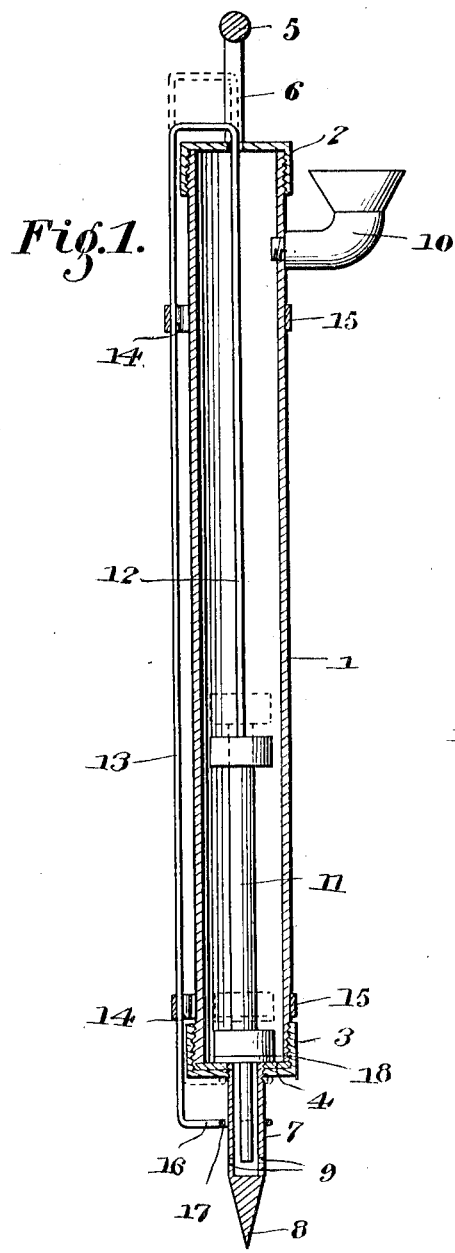
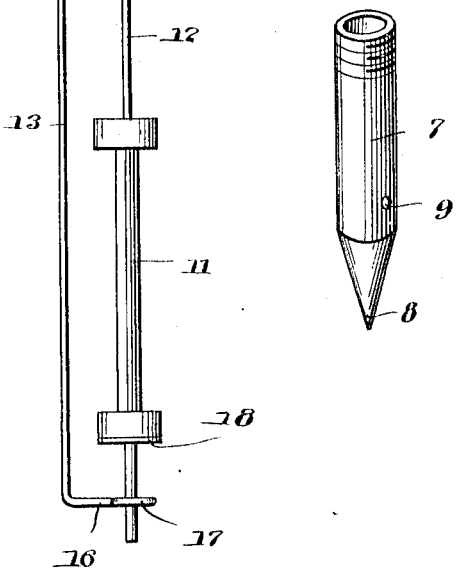
Witnesses
Frederick W. Ely.
Inventor
Waltzer Gunnarson,
By Victor J. Evans
Attorney

UNITED STATES PATENT OFFICE.

WALTZER GUNNARSON, OF NEW ROCHELLE, NEW YORK.

WEED-DESTROYER.

1,118,854.  Specification of Letters Patent.  Patented Nov. 24, 1914.

Application filed July 7, 1914. Serial No. 849,522.

*To all whom it may concern:*

Be it known that I, WALTZER GUNNARSON, a citizen of the United States, residing at New Rochelle, in the county of Westchester and State of New York, have invented new and useful Improvements in Weed-Destroyers, of which the following is a specification.

This invention is an improved device for destroying weeds by injecting a liquid herbicide into the hearts of plants, the object of the invention being to provide an improved device of this character which is very readily operated, is cheap and simple and by means of which a lawn may be readily kept free from dandelions and other objectionable weeds and plants.

The invention consists in the construction, combination and arrangement of devices hereinafter described and claimed.

In the accompanying drawings:—Figure 1 is a vertical central sectional view of a weed destroyer constructed in accordance with my invention. Fig. 2 is a detail perspective view of the nozzle. Fig. 3 is a detail elevation of the valve and its operating rod.

In accordance with my invention I provide a barrel 1 which may in practice be made of a piece of pipe of suitable length and which is provided at its upper end with a screw cap 2 and at its lower end with a screw cap 3. The lower screw cap 3 has a leather washer 4. A handle 5 is arranged above the upper end of the barrel and secured thereto by a pair of bails 6. A nozzle 7 is secured to the center of the lower cap, has a closed pointed end 8 and also has, at a suitable distance above the point lateral openings 9 which communicate with its bore. A filling funnel 10 is connected to the barrel, near its upper end and enables the barrel to be readily filled with a suitable herbicide.

A valve 11 is arranged to operate in the lower end of the barrel and is secured on a rod 12 which passes through the center of the barrel and through the upper cap and the lower end of which operates in the bore of the nozzle and serves to prevent the nozzle from becoming clogged. This rod has a guide member 13 parallel therewith and which is arranged on the outer side of the barrel and which operates in eyes or guide openings 14 formed in bands 15 which are clamped around the barrel at points near its ends. At the lower end of the guide rod 13 is a tappet arm 16 which extends under the barrel and has an open loop 17 through which the nozzle extends. The valve 11 is provided with a washer 18 at its lower end.

In the operation of my invention the valve normally closes by its own weight. The device is grasped by the handle and when it is desired to destroy a weed or other plant the device is thrust downwardly to cause the nozzle to be inserted in the heart of the plant and as the nozzle is thus thrust downwardly the tappet arm 16 is engaged by the earth and hence as the barrel and nozzle continue to be forced downwardly the valve is raised from its seat so that the liquid herbicide is caused to flow out through the openings 9 into the heart of the plant before the device is raised. The raising of the device causes the valve to close by its own weight and stop any further flow of the herbicide. The effect of the latter is to kill the plant and without defacing the lawn.

It will be understood that my improved weed destroyer may be very readily and rapidly manipulated so that all the weeds on a lawn may be readily killed in a short time and with little labor.

Having thus described my invention, I claim:—

The herein described weed destroyer comprising a barrel having a nozzle at its lower end and adapted to be thrust into a plant, a valve in the barrel to control the discharge fluid therefrom, a rod arranged in the barrel and to which the valve is connected, said rod extending downwardly into the bore of the nozzle to keep the latter clean, a guide rod mounted for longitudinal movement on the barrel and connected to the valve rod, said guide rod having a tappet element at its lower end, the said tappet element having a loop through which the nozzle extends.

In testimony whereof I affix my signature in presence of two witnesses.

WALTZER GUNNARSON.

Witnesses:
W. S. HITCHCOCK,
WALLACE C. MARGRAF.

Copies of this patent may be obtained for five cents each, by addressing the "Commissioner of Patents, Washington, D. C."